United States Patent
Aughton

(10) Patent No.: US 8,302,463 B2
(45) Date of Patent: *Nov. 6, 2012

(54) LOSS DETECTION SYSTEM FOR OPEN CHANNEL NETWORKS

(75) Inventor: David Aughton, Victoria (AU)

(73) Assignee: Rubicon Research Pty Ltd., Surrey Hills, Victoria (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/633,211

(22) Filed: Dec. 8, 2009

(65) Prior Publication Data

US 2010/0147054 A1     Jun. 17, 2010

Related U.S. Application Data

(63) Continuation of application No. 10/591,825, filed as application No. PCT/AU2005/000416 on Mar. 22, 2005, now Pat. No. 7,647,817.

(30) Foreign Application Priority Data

Mar. 22, 2004   (AU) ............................... 2004901525

(51) Int. Cl.
    *G01M 3/04*   (2006.01)
(52) U.S. Cl. .......................................................... 73/40
(58) Field of Classification Search ............... 137/15.11; 138/90
    See application file for complete search history.

(56) References Cited

U.S. PATENT DOCUMENTS

| | | | |
|---|---|---|---|
| 4,386,525 A | | 6/1983 | Mooney |
| 4,547,286 A | * | 10/1985 | Hsiung .......................... 210/284 |
| 4,805,453 A | | 2/1989 | Haynes |
| 4,852,054 A | * | 7/1989 | Mastandrea .................... 73/49.1 |
| 4,862,733 A | | 9/1989 | Hyfantis, Jr. et al. |
| 5,756,880 A | | 5/1998 | Chen et al. |

FOREIGN PATENT DOCUMENTS

| | | |
|---|---|---|
| JP | 58-066036 A | 4/1983 |
| WO | WO02/16698 | 2/2002 |
| WO | WO 02/71163 A1 | 2/2002 |
| WO | WO 02/071163 A1 | 9/2002 |

OTHER PUBLICATIONS

Sagi, Hemi, "Quality 101: Trends in Leak Tightness Testing", Quality Magazine (Online), Oct. 1, 2004, retrieved from <URL:http://www.qualitymag.com/CDA/Articleinformation/features/BNP_Features_Item/0.6425.135671.00.html>, 5 pages.

PCT International Search Report and Written Opinion dated May 12, 2005, for International Application No. PCT/AU2005/000416, 9 pages.

(Continued)

*Primary Examiner* — Peter Macchiarolo
*Assistant Examiner* — Alex Devito
(74) *Attorney, Agent, or Firm* — Sheppard, Mullin, Richter & Hampton LLP

(57) ABSTRACT

The invention discloses a loss detection system to determine and monitor containment losses for open channel networks. One exemplary method comprises monitoring a flow of liquid from an open channel into a pool, the open channel comprising channel banks and a bed, controlling the flow of liquid such that a level of liquid within the pool is constant, and determining theft loss of liquid based on the monitored flow of liquid.

18 Claims, 2 Drawing Sheets

OTHER PUBLICATIONS

International Preliminary Report on Patentability dated Sep. 26, 2006, for International Application No. PCT/AU2005/000416, 1 page.

Ham, J.M., "Measuring Evaporation and Seepage Losses from Lagoons Used to Contain Animal Waste," Transactions of the ASAE, vol. 42, No. 5, pp. 1303-1312, Sep. 1999.

Zhi, Xu et al., "Analysis on Loss of Water Transportation of Natural Riverway of Connection Section of South of Main Flow of Introduced Yellow River," Shanxi Water Conservancy Technology, Total No. 116, No. 2, May 1997.

EP Application No. 05714288.7, European Search Report mailed Oct. 18, 2007.

EP Application No. 05714288.7, European Search Opinion mailed Feb. 8, 2008.

EP Application No. 10185207.7, European Search Report and European Search Opinion mailed Nov. 29, 2010.

* cited by examiner

LOSS DETECTION SYSTEM FOR OPEN CHANNEL NETWORKS

CROSS-REFERENCE TO RELATED APPLICATION

This application is a continuation of and seeks priority to U.S. Nonprovisional application Ser. No. 10/591,825, filed Jun. 19, 2007, now U.S. Pat. No. 7,647,817 entitled "Loss Detection for Open Channel Networks," which is a National Stage entry of International Application No. PCT/AU05/00416, filed on Mar. 22, 2005, which claims priority from Australian Patent Application No. 2004901525 filed on Mar. 22, 2004, all of which are hereby incorporated by reference.

This invention relates to a loss detection system for open channel networks and relates particularly, though not exclusively, to a loss detection system for irrigation reticulation networks.

Open channel networks are used extensively around the world for the conveyance of liquids over distances and for the distribution of liquids to various users. The liquid is primarily water and the major application is irrigation reticulation networks. As irrigation is the major user of water in the world, the high losses that are associated with channel networks is a major challenge for the management of this limited resource. A channel is typically controlled by the use of flow regulators at various intervals along the length of a channel. Flow regulators are used to control the flow of liquid passing through the regulator and at the same time maintaining the desired water level upstream of the regulator. The reach of water between adjacent flow regulators is defined as a 'pool.'

In International Patent Application No. PCT/AU02/00230 (WO 02/071163) there is described a system for controlling a channel network and allows accurate control and measurement of water in channels. The "Control Algorithm" defined in WO 02/071163 automatically achieves the desired control objectives (water levels and flows) for a channel network. In International Patent Application No. PCT/AU01/01036 (WO 02/16698) there is described a flow regulator that can be used with that system and will allow accurate regulation of water therethrough. The flow regulator or control gate is an actuated device that responds to control commands from the "Control Algorithm." The control gate can measure the flow rate that through it passes it and also has water tight sealing capability. In order to avoid the duplication of description the contents of WO 02/071163 and WO 02/16698 are incorporated herein in their entirety.

The applicant has determined that losses of water from the channel networks can be categorized as either operational losses or containment losses. The operational losses are from:
  Outfalls: Channel spills that are usually associated with manual or limited control capability.
  Measurement Error: The error associated with both accurate and continuous measurement of flows in open channels.
  System Filling: Most channel systems are used on a seasonal basis and have losses associated with filling and draining.
The containment losses are from:
  Leakage: Leaks through channel banks.
  Seepage: The loss of water through the bed of the channel.
  Evaporation: Evaporation from the free surface of the channel.
  Unauthorized Use: The un-recorded extraction or theft of water from channels.

It is an object of the present invention to provide a system and method which can determine and monitor the containment loss from one or more pools or channels.

With these objects in view the present invention in one aspect provides a loss detection system to determine and monitor containment losses for open channel networks, said system including at least first and second flow regulators to allow flow of liquid into and out of at least one pool respectively, first and second flow sensors co-operating with respective flow regulators and a computational means communicating with said flow regulators and said flow sensors to control operation of said flow regulators, and said computational means determining said containment losses by calculating the measured flow into said at least one pool through said at least first flow regulator and subtracting the measured flow out of said at least one pool through said at least second regulator.

Preferably said at least one pool includes at least one liquid metered delivery means which communicates with said computational means and the measured flow therefrom is also subtracted from the measured flow into said at least one pool through said at least first flow regulator. Said containment losses are divided into losses from theft, evaporation, seepage and leakage where losses from evaporation, seepage and leakage remain constant to allow the theft loss to be determined by said computational means. The evaporation losses can be determined by the formula: $E_{vp}=0.01 \times P_f \times E_{pp} \times SA$ Where:
  $E_{vp}$=the volume (Megalitres) lost to evaporation from the pool water surface for a period 'p';
  $P_f$=pan factor (Class A);
  $E_{pp}$=pan evaporation for period 'p' (millimeters); and
  SA=surface area of the pool.

In a further aspect of the invention there is provided a method of loss detection to determine and monitor containment losses for open channel networks, said open channel network including at least first and second flow regulators to allow flow of liquid into and out of at least one pool respectively, first and second flow sensors co-operating with respective flow regulators and a computational means communicating with said flow regulators and said flow sensors to control operation of said flow regulators, said method including the step of determining, using said computational means, said containment losses by calculating the measured flow into said at least one pool through said at least first flow regulator and subtracting the measured flow out of said at least one pool through said at least second regulator.

In a further aspect of the invention there is provided a method of loss detection to determine containment losses due to seepage and leakage from at least one pool, said method including the steps of measuring the change in volume of said at least one pool, determining the evaporation losses and calculating the containment losses by subtracting the evaporation losses from the change in volume of said at least one pool.

In still yet a further aspect of the invention there is provided a method of loss detection to determine containment losses due to seepage and leakage from at least one pool, said method including the steps of maintaining a constant level in said at least one pool, monitoring the nett flow into said at least one pool to maintain said constant level, determining the evaporation losses and calculating the containment losses by subtracting the evaporation losses from the nett flow into said at least one pool.

In various embodiments, an exemplary method comprises monitoring a flow of liquid from an open channel into a pool, the open channel comprising channel banks and a bed, controlling the flow of liquid such that a level of liquid within the pool is constant, and determining theft loss of liquid based on the monitored flow of liquid.

An exemplary system may comprise a first regulator to allow flow of liquid into a pool from an open channel, the open channel comprising channel banks and a bed, a second regulator to allow flow of liquid out of the pool of liquid, first and second flow sensors co-operating with the flow regulators, and computational means communicating with the flow regulators and the flow sensors to control operation of the flow regulators and to determine theft loss by calculating a measured flow into the pool through the first flow regulator and subtracting a measured flow out of the pool through the second regulator.

Another exemplary method may comprise monitoring a flow of liquid leaving a pool which receives the liquid through an open channel, the open channel comprising channel banks and a bed, controlling the flow of liquid such that a level of liquid within the pool is constant, and determining theft loss of liquid based on the monitored flow of liquid.

In order that the invention may be more readily understood and put into practical effect, reference will now be made to the accompanying drawings, in which:—

Figure 1:
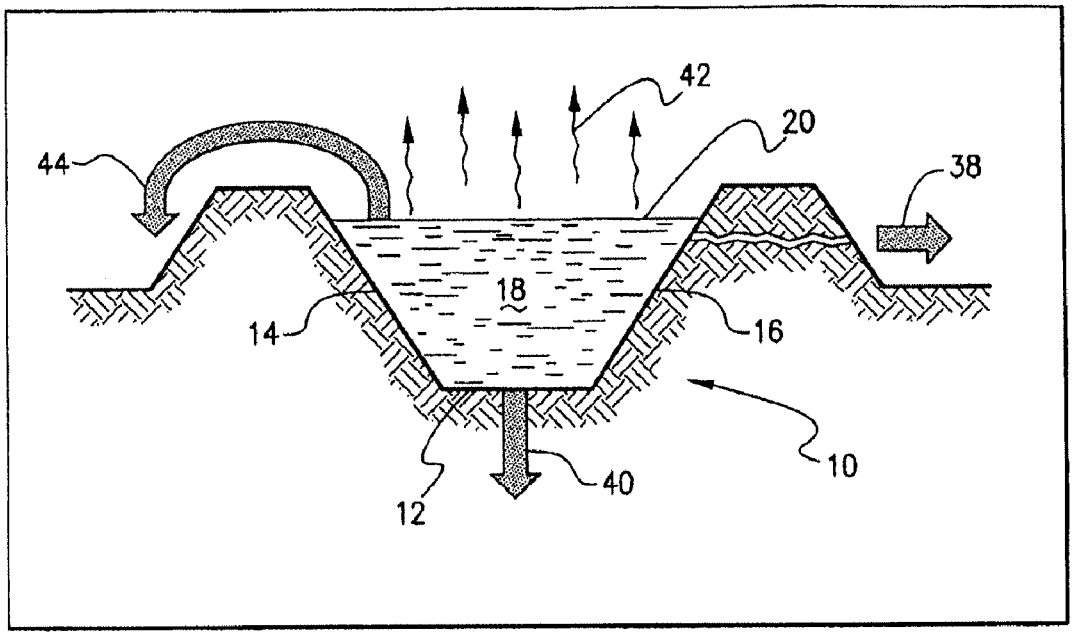
FIG. 1 is a diagrammatic view of a pool and the containment losses that occur from the pool.

FIG. 1 of the drawings illustrates the containment losses from a pool as previously discussed. Pool 10 has a bed 12 with channel banks 14, 16 which contain water 18. Leakage 38 occurs through channel banks 14, 16 whilst seepage 40 occurs through bed 12. Natural evaporation 42 will occur from the surface 20 of water 18 during daylight hours. Theft 44 of water 18 will typically occur by unauthorized pumping of water 18 from pool 10.

It is preferred that the invention be associated with the system for controlling a channel network disclosed in WO 02/071163 and to use the control gate disclosed in WO 02/16698. Using such a system and the control gates will eliminate operational losses from consideration due to the accurate flow measurement and the prevention of leakage through these types of gates. The system of the invention could not be envisioned without the development of these control gates. The invention is not limited to such a system and control gates as it could be applied to other systems if, and when available.

Figure 2:
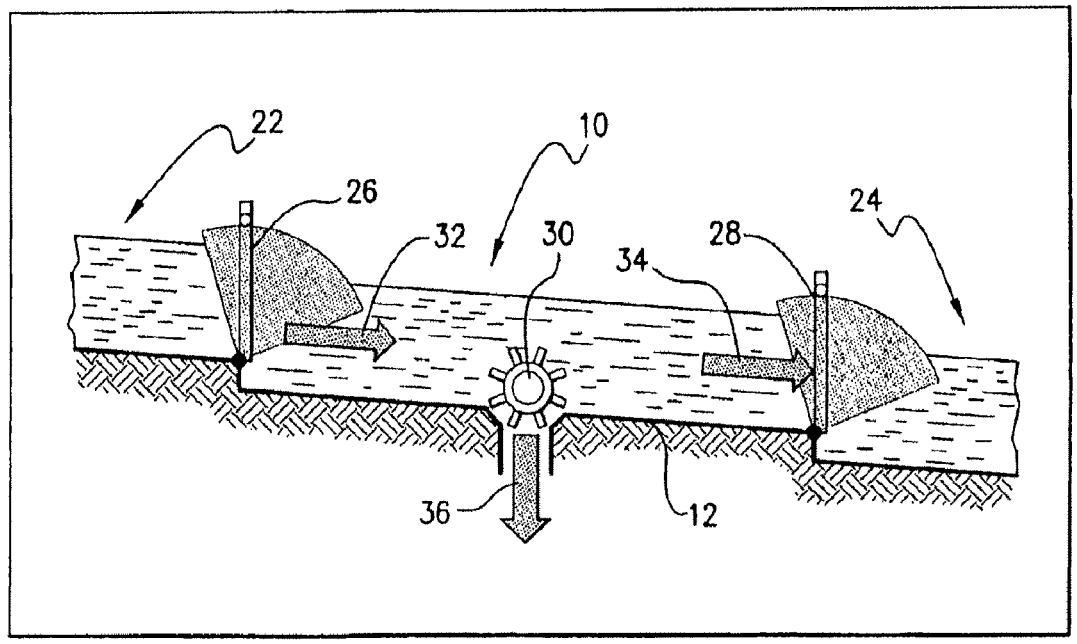
FIG. 2 is a diagrammatic view of a pool containment system used in accordance with the invention.

FIG. 2 shows pool 10 located between pools 22, 24. An inlet control gate 26 separates pool 22 from pool 10 and outlet control gate 28 separates pool 10 from pool 24. Control gates 26, 28 are of the type shown described in WO 02/16698 which can accurately measure the flow rate therethrough and have a watertight sealing capacity to avoid any leakage through control gates 26, 28. A flowmeter 30 in pool 10 provides authorized access for the removal of water from pool 10. The flowmeter can be positioned in any position where the water is removed e.g. it can be in an intake pipe opening into pool 10, at the exit of a pump, in the bed 12 (as visually depicted), in the channel banks 14, 16 or any other suitable or convenient location. Each pool can have many or no flowmeters. Flowmeter 30 and control gates 26, 28 are linked to a computer (not shown) which is associated with the system (not shown) for controlling the channel network disclosed in WO 02/071163. The accurate and continuous measurement of flow at control gates 26, 28, both into and out of pool 10, and the flow through flowmeter 30, results in a nett water balance for pool 10. The loss detection system of the invention addresses the containment losses in pool 10. The containment loss is shown in FIG. 2 and is equal to the sum of the measured flows 32 entering pool 26 through control gate 26, minus the sum of the measured flows 34 exiting pool 10 through control gate 28, and minus the measured flows 36 as metered delivery through flowmeter 30 to users.

The resultant containment loss is the sum of the leakage 38, seepage 40, evaporation 42 and theft losses 44 shown in FIG. 1. This containment loss is based on the assumption that nett volume of pool 10 remains constant. The system (not shown) for controlling the channel network disclosed in WO 02/071163 will be programmed to maintain a constant water level and ensure this condition to be the case. This assumption is valid for conditions when flows into and out of pool 10 remain constant. The typical dynamic operation of an irrigation channel, where users start and stop their use of the water, will require filtering or pool volume calculation techniques to take out the dynamics of the pool operation. Filtering techniques, such as the average flow over a selected time frame, are suitable. The change in pool volume can be computed from the change in water levels for pool 10 monitored at control gates 26 and 28.

Figure 3:
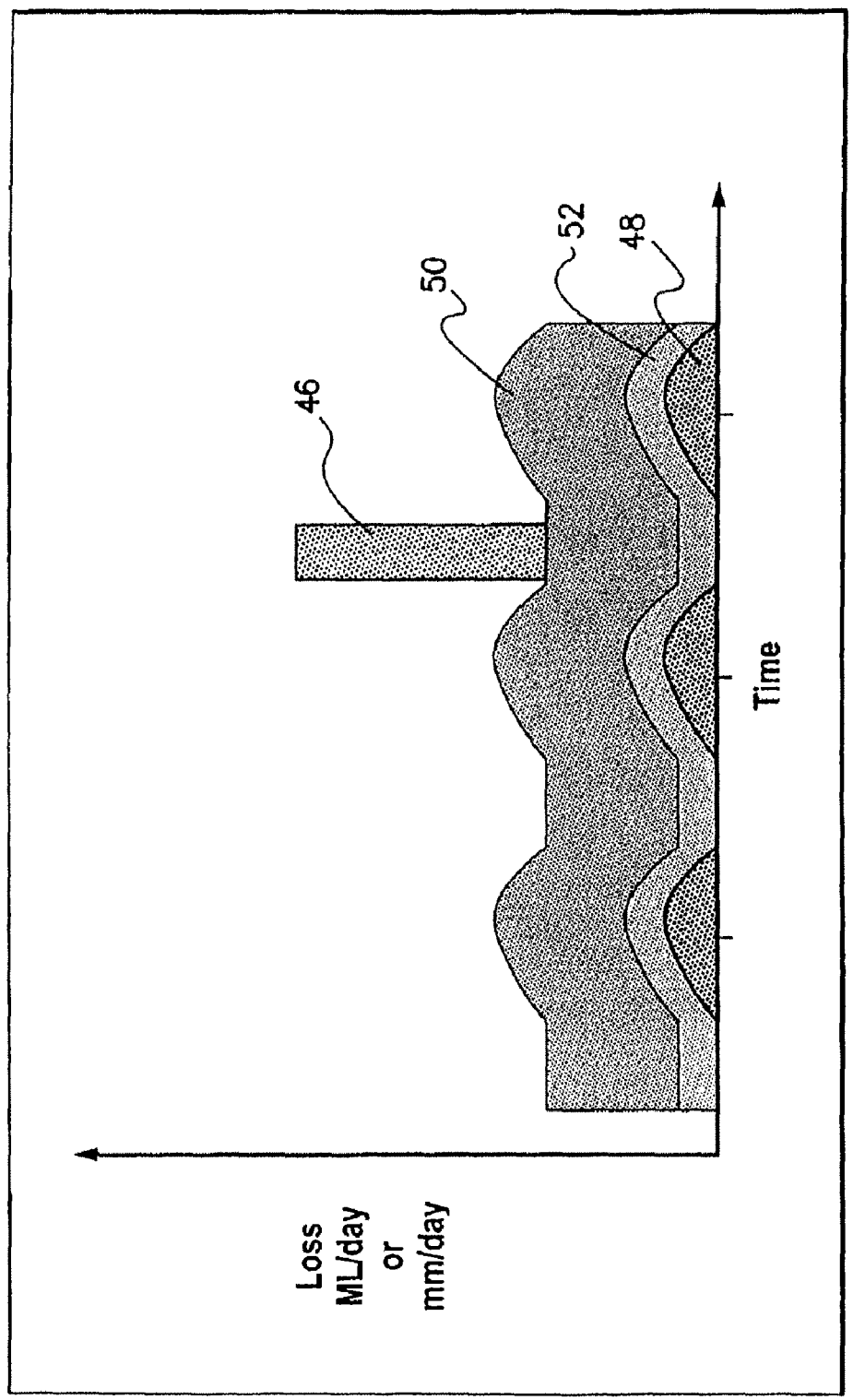
FIG. 3 is a graphical representation of the various losses from the pool containment system shown in FIG. 2 plotted against time.

The unauthorized extraction or theft 44 of water from pool 10 can typically be detected as a 'spike' in the continuously measured containment loss over time. FIG. 3 shows this spike 46 in the graph of the containment loss of Megalitres/day or mm/day, plotted against the daily time period. The gradations of time shown on the graph indicate midday. The evaporation loss 48 shown on FIG. 3 will have a diurnal variation attributed to the loss during sunlight periods. The evaporation loss 48 can be calculated using standard techniques for the evaporation of water from a free surface. An example of such a technique being given by the following formula:

$$E_{vp} = 0.01 \times P_f \times E_{pp} \times SA$$

Where:

$E_{vp}$=the volume (Megalitres) lost to evaporation from the pool water surface for a period 'p';

$P_f$=pan factor (Class A);

$E_{pp}$=pan evaporation for period 'p' (millimeters); and

SA=surface area of the pool.

The remaining leakage 50 and seepage 52 losses are assumed to be constant, especially over the duration which most analysis would occur. Typically, this duration would be days or months. The combined leakage 50 and seepage 52 losses can therefore be determined for pool 10. The ability to identify combined leakage and seepage is important for the ongoing maintenance of channel systems with the object of keeping losses to a minimum. The user can take action to reduce these losses by ascertaining where the seepage and/or leakage are occurring and instigating relevant repairs.

The loss detection system aids in the location of the sources of containment losses. The loss detection system uses real-time data gathering software and graphing systems to assist in this process.

A specific aspect of the invention is the calculation of containment loss when channels or pools are not delivering water to users. In this case the automatic control system will maintain the channel flows to supply containment loss only. When this situation occurs, as a result of a 'rainfall shutdown,' then it can also be assumed that there is unlikely to be theft from the channel or pool. Because evaporation can be directly computed, then the containment loss minus evaporation is attributed to leakage and seepage only. Removing other calculation inputs to containment loss therefore increases the accuracy of the computation. This process provides a means of accurately calibrating and/or recalibrating the combined leakage and seepage in the channel or pool system as this can be assumed to be relatively constant.

Another means of calculating leakage and seepage loss is to close the control gates 26, 28 to ensure no water is entering or leaving pool 10. The change in volume can then be determined by measuring the change in water level. The containment loss in this circumstance is the rate of change of volume of pool 10. Leakage and seepage loss equals containment loss minus the computed evaporation.

Another feature of the loss detection system is the ability to continually audit the status of losses in channel or pool networks. The demand for water, a limited resource, is increasing rapidly around the world and in turn, water is increasing in value. Managers of channel or pool supply systems therefore are under increasing pressure to keep losses to a minimum. This invention provides the continuous monitoring of the status of losses to ensure action can be taken to address new leaks when they occur. Another feature of continuous auditing is the ability to accurately allocate available water reserves for users to ensure the maximum use of the resource is achieved.

Although the preferred embodiment has been described with reference to the use of a single pool 10, the invention is not so limited. The determination of containment losses can be computed across a plurality of discrete pools, an aggregation of pools or a combination of pools.

The invention will be understood to embrace many further modifications as will be readily apparent to persons skilled in the art and which will be deemed to reside within the broad scope and ambit of the invention, there having been set forth herein only the broad nature of the invention and a certain specific embodiment by way of example.

The invention claimed is:

1. A method comprising:
   monitoring a flow of liquid from an open channel into a pool, the open channel comprising channel banks and a bed;
   controlling the flow of liquid such that a level of liquid within the pool is constant;
   detecting, an unexpected spike in containment loss over time based at least in part on the monitored flow of liquid; and
   determining theft loss of liquid based on the detection,
   wherein determining theft loss of liquid comprises that variables including seepage of liquid through the bed of the channel, leakage of liquid through the channel banks, and evaporation are constant.

2. The method of claim 1, wherein controlling the flow of liquid comprises controlling at least one regulator that regulates the amount of liquid entering the pool.

3. The method of claim 1, wherein controlling the flow of liquid comprises controlling at least one regulator that regulates the amount of liquid leaving the pool.

4. The method of claim 1, wherein determining theft loss of liquid further comprises detecting an increase, for a short period of time, of the flow of liquid into the pool, the increase required to keep the level of liquid within the pool constant.

5. The method of claim 1, wherein the evaporation losses can be determined by the formula:

$$E_{vp}=0.01 \times P_f \times E_{pp} \times SA,$$

where:
   $E_{vp}$=the volume (Megaliters) lost to evaporation from the pool water surface for a period 'p';
   $P_f$=pan factor (Class A);
   $E_{pp}$=pan evaporation for period 'p' (millimeters); and
   SA=surface area of the pool.

6. The method of claim 1, wherein determining theft loss of liquid comprises:
   measuring a change in volume of the pool liquid;
   determining evaporation losses;
   determining leakage and seepage losses; and
   calculating the loss due to theft by subtracting the evaporation, leakage, and seepage losses from the change of volume.

7. The method of claim 1, further comprising monitoring a flow of liquid from the pool.

8. The method of claim 7, wherein monitoring a flow of liquid from the pool comprises monitoring the flow of liquid from the pool using a sensor.

9. The method of claim 1, wherein monitoring the flow of liquid from an open channel into a pool comprises monitoring the flow of liquid with a sensor.

10. A system comprising:
    a first regulator to allow flow of liquid into a pool from an open channel, the open channel comprising channel banks and a bed;
    a second regulator to allow flow of liquid out of the pool of liquid;
    first and second flow sensors co-operating with the flow regulators; and
    computational means communicating with the flow regulators and the flow sensors to control operation of the flow regulators and to determine theft loss by calculating a measured flow into the pool through the first flow regulator and subtracting a measured flow out of the pool through the second regulator to detect an unexpected spike in containment loss over time based at least in part on the monitored flow of liquid, wherein determining theft loss of liquid comprises that variables including seepage of liquid through the bed of the channel leakage of liquid through the channel banks, and evaporation are constant.

11. The system of claim 10, wherein determining theft loss of liquid further comprises detecting an increase, for a short period of time, of the flow of liquid into the pool, the increase required to keep a level of liquid within the pool constant.

12. The system of claim 10, wherein the evaporation losses can be determined by the formula:

$$E_{vp}=0.01 \times P_f \times E_{pp} \times SA,$$

where:
   $E_{vp}$=the volume (Megaliters) lost to evaporation from the pool water surface for a period 'p';
   $P_f$=pan factor (Class A);
   $E_{pp}$=pan evaporation for period 'p' (millimeters); and
   SA=surface area of the pool.

13. The system of claim 10, wherein the computational means communicating with the flow regulators and the flow sensors to determine theft loss comprises the computations means being configured to measure the change in volume of the pool of liquid, determine the evaporation losses, determine the leakage and seepage losses, and calculate the loss due to theft by subtracting the evaporation, leakage, and seepage losses from the change of volume.

14. A method comprising:
    monitoring a flow of liquid leaving a pool, wherein the pool receives the liquid through an open channel, the open channel comprising channel banks and a bed;

controlling the flow of liquid such that a level of liquid within the pool is constant;

detecting an unexpected spike in containment loss over time based at least in part on the monitored flow of liquid; and determining theft loss of liquid based on the detection, wherein determining theft loss of liquid comprises that variables including seepage of liquid through the bed of the channel, leakage of liquid through the channel banks, and evaporation are constant.

15. The method of claim 14, wherein controlling the flow of liquid comprises controlling at least one regulator that regulates the amount of liquid leaving the pool.

16. The method of claim 14, wherein determining theft loss of liquid further comprises detecting a decrease, for a short period of time, of the flow of liquid leaving the pool, the decrease required to keep the level of liquid within the pool constant.

17. The method of claim 14, wherein the evaporation losses can be determined by the formula:

$$E_{vp}=0.01 \times P_f E_{pp} \times SA,$$

where:
$E_{vp}$=the volume (Megaliters) lost to evaporation from the pool water surface for a period 'p';
$P_f$=pan factor (Class A);
$E_{pp}$=pan evaporation for period 'p' (millimeters); and
SA=surface area of the pool.

18. The method claim 14, wherein determining theft loss of liquid further comprises:
measuring a change in volume of the pool of liquid;
determining evaporation losses;
determining leakage and seepage losses; and
calculating the loss due to theft by subtracting the evaporation, leakage, and seepage losses from the change of volume.

\* \* \* \* \*

UNITED STATES PATENT AND TRADEMARK OFFICE
CERTIFICATE OF CORRECTION

PATENT NO. : 8,302,463 B2
APPLICATION NO. : 12/633211
DATED : November 6, 2012
INVENTOR(S) : David Aughton It is certified that error appears in the above-identified patent and that said Letters Patent is hereby corrected as shown below:

Column 5, line 43, "detecting, an unexpected" should be changed to --detecting an unexpected--.

Column 6, line 6, "pool liquid" should be changed to --pool of liquid--.

Column 6, line 39, "bed of the channel leakage" should be changed to --bed of the channel, leakage--.

Column 8, line 3, "Evp = 0.01 × Pf Epp × SA," should be changed to
--Evp = 0.01 × Pf × Epp × SA,--.

Signed and Sealed this
Eighteenth Day of December, 2012

David J. Kappos
*Director of the United States Patent and Trademark Office*